United States Patent
Huang et al.

(10) Patent No.: US 10,656,676 B2
(45) Date of Patent: May 19, 2020

(54) DOCKING DEVICE, ELECTRICAL DEVICE, AND MAC ADDRESS CLONING METHOD

(71) Applicant: Realtek Semiconductor Corporation, Hsinchu (TW)

(72) Inventors: Zhen-Ting Huang, Yunlin County (TW); Chun-Hao Lin, New Taipei (TW); Er-Zih Wong, Taichung (TW); Shih-Chiang Chu, Taipei (TW)

(73) Assignee: Realtek Semiconductor Corporation, Hsinchu (TW)

( * ) Notice: Subject to any disclaimer, the term of this patent is extended or adjusted under 35 U.S.C. 154(b) by 51 days.

(21) Appl. No.: 15/869,069

(22) Filed: Jan. 12, 2018

(65) Prior Publication Data

US 2019/0079558 A1 Mar. 14, 2019

Related U.S. Application Data

(60) Provisional application No. 62/555,659, filed on Sep. 8, 2017.

(51) Int. Cl.
*G06F 1/16* (2006.01)
*G06F 13/40* (2006.01)
*G06F 9/4401* (2018.01)
*G06F 13/38* (2006.01)
(Continued)

(52) U.S. Cl.
CPC .......... *G06F 1/1632* (2013.01); *G06F 9/4411* (2013.01); *G06F 13/385* (2013.01); *G06F 13/4072* (2013.01); *G06F 13/4081* (2013.01); *G06F 13/4282* (2013.01);
(Continued)

(58) Field of Classification Search
CPC .... G06F 1/1632; G06F 9/4411; G06F 13/385; G06F 13/4072; G06F 13/4081; G06F 13/4282; G06F 2213/0026; G06F 2213/0042; G06F 2213/3808; H04L 61/6022

See application file for complete search history.

(56) References Cited

U.S. PATENT DOCUMENTS

2006/0097679 A1* 5/2006 Jeong ..................... G11B 19/20
  318/455
2006/0114894 A1* 6/2006 Cherchali ......... H04L 29/12216
  370/389
2009/0164690 A1 6/2009 Slaight
(Continued)

FOREIGN PATENT DOCUMENTS

CN 105378694 A 3/2016

OTHER PUBLICATIONS

"Universal Serial Bus Type-C Cable and Connector Specification", 2014 USB 3.0 Promoter Group, Aug. 11, 2014.

*Primary Examiner* — Henry Tsai
*Assistant Examiner* — John B Roche
(74) *Attorney, Agent, or Firm* — CKC & Partners Co., LLC

(57) ABSTRACT

A docking device includes a bus interface and a network interface controller. The bus interface is configured to be connected to a host device. The network interface controller is coupled to the bus interface and configured to receive a host-based MAC address of the host device and load the host-based MAC address for a network communication, if the host device is connected to the docking device via the bus interface. The host-based MAC address is stored in a table with a vendor specific format structure in a BIOS of the host device.

16 Claims, 7 Drawing Sheets

(51) Int. Cl.
*G06F 13/42* (2006.01)
*H04L 29/12* (2006.01)

(52) U.S. Cl.
CPC .......... *G06F 2213/0026* (2013.01); *G06F 2213/0042* (2013.01); *G06F 2213/3808* (2013.01); *H04L 61/6022* (2013.01)

(56) References Cited

U.S. PATENT DOCUMENTS

| | | | |
|---|---|---|---|
| 2013/0031350 A1* | 1/2013 | Thielen | G06F 9/4411 |
| | | | 713/100 |
| 2013/0262700 A1* | 10/2013 | Tamura | H04L 61/25 |
| | | | 709/245 |
| 2015/0188753 A1* | 7/2015 | Anumala | H04L 45/48 |
| | | | 370/225 |
| 2015/0350014 A1 | 12/2015 | McKeever | |
| 2016/0036767 A1 | 2/2016 | Gillon et al. | |
| 2016/0149749 A1* | 5/2016 | Bunker | H04L 12/282 |
| | | | 709/217 |
| 2016/0188508 A1 | 6/2016 | Tung | |
| 2017/0017595 A1* | 1/2017 | Schnell | G06F 13/385 |
| 2017/0046297 A1 | 2/2017 | Chang et al. | |
| 2018/0060261 A1 | 3/2018 | Chhor et al. | |
| 2018/0165053 A1 | 6/2018 | Kuo et al. | |
| 2018/0293197 A1 | 10/2018 | Grobelny et al. | |
| 2018/0307290 A1 | 10/2018 | Montero et al. | |
| 2018/0376385 A1* | 12/2018 | Killadi | H04W 28/08 |

* cited by examiner

DOCKING DEVICE, ELECTRICAL DEVICE, AND MAC ADDRESS CLONING METHOD

RELATED APPLICATIONS

This application claims priority to U.S. Provisional Application Ser. No. 62/555,659 filed Sep. 8, 2017, which are herein incorporated by reference.

BACKGROUND

Technical Field

The present disclosure relates to a docking device. More particularly, the present disclosure relates to a docking device with network interface controller (NIC).

Description of Related Art

In recent years, as the development of the ultra-thin laptops and tablets, more and more electrical devices are designed without an embedded network interface controller (NIC). On the other hand, external NIC dongles or docks are widely used to connect the ultra-thin laptops and/or tablets to the Preboot eXecution Environment (PXE) network.

SUMMARY

A docking device includes a bus interface and a network interface controller. The bus interface is configured to be connected to a host device. The network interface controller is coupled to the bus interface and configured to receive a host-based MAC address of the host device and load the host-based MAC address for a network communication, if the host device is connected to the docking device via the bus interface. The host-based MAC address is stored in a table with a vendor specific format structure in a BIOS of the host device.

An electrical device includes a bus interface communicatively coupled to a docking device including a network interface controller, one or more processing components coupled to the bus interface, a memory coupled to the one or more processing components; and one or more programs. The one or more programs are stored in the memory and configured to be executed by the one or more processing components, and the one or more programs include instructions for: parsing a table with a vendor specific format structure stored in a BIOS of the electrical device to obtain a host-based MAC address corresponding to the electrical device; and transmitting, the host-based MAC address via the bus interface to the docking device for the docking device to load for a network communication if the docking device is connected to the bus interface.

A mac address cloning method includes: loading, by a network interface controller of a docking device, a default MAC address stored in a memory of the docking device for a network communication; parsing, by a NIC driver, a table with a vendor specific format structure stored in a BIOS of a host device connected to the docking device to obtain a host-based MAC address corresponding to the host device; transmitting, by the NIC driver, the host-based MAC address via a bus interface to the docking device; and loading, by the network interface controller, the host-based MAC address for the network communication if the host device is connected to the docking device.

It is to be understood that both the foregoing general description and the following detailed description are by examples, and are intended to provide further explanation of the disclosure as claimed.

DETAILED DESCRIPTION

Reference will now be made in detail to the present embodiments of the disclosure, examples of which are illustrated in the accompanying drawings. Like elements in description are designated with the same reference numbers for ease of understanding. In addition, in this document, the term "coupled" may also be termed as "electrically coupled," and the term "connected" may be termed as "electrically connected". "Coupled" and "connected" may also be used to indicate that two or more elements cooperate or interact with each other.

Figure 1:
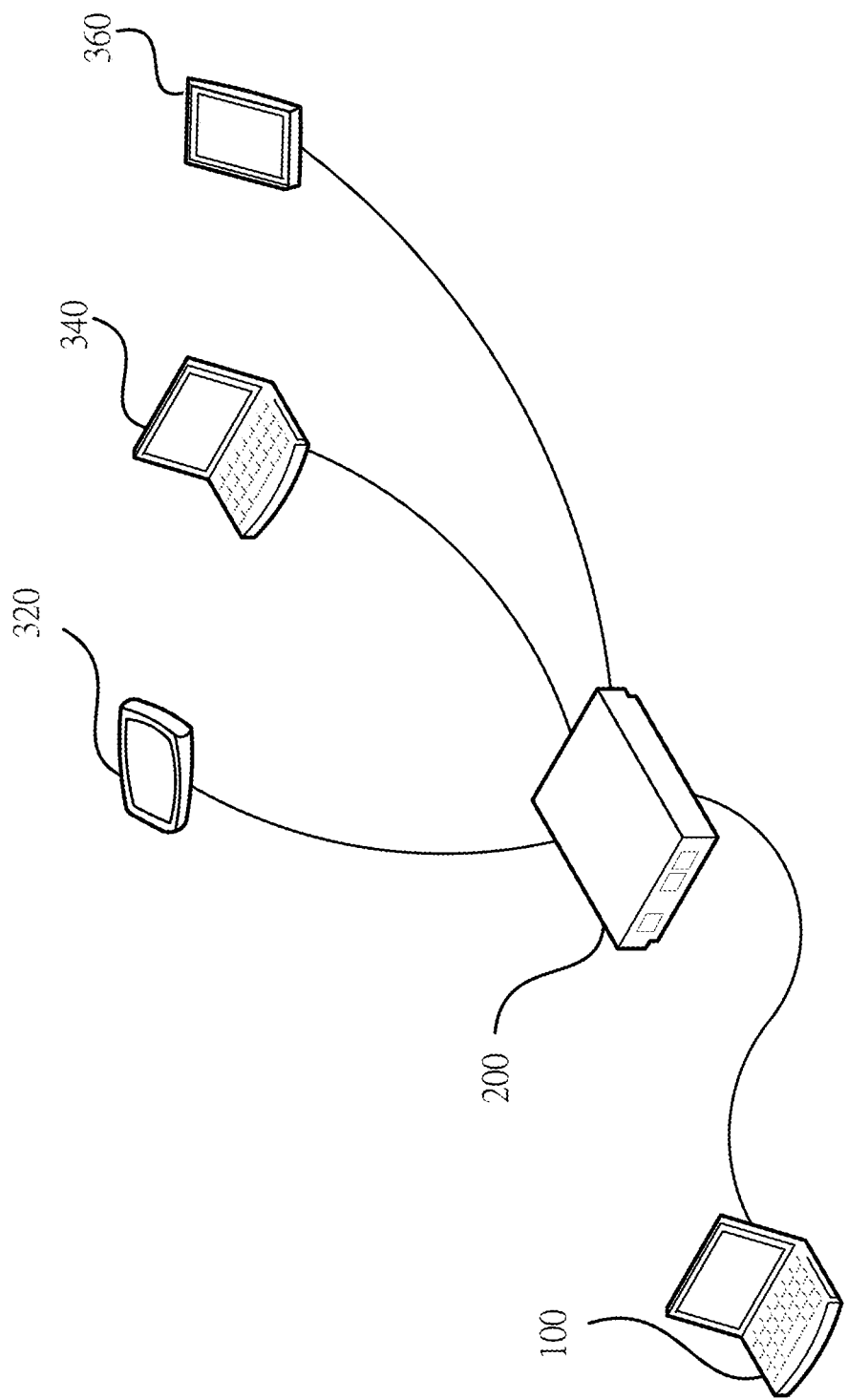
FIG. 1 is a schematic diagram illustrating a network system according to some embodiments of the present disclosure.

Referring to FIG. 1, the network system includes a host device 100, a docking/dongle device 200 and one or more networked electrical devices 320, 340, and 360. For example, the host device 100 and the electrical devices 320, 340, and 360 may be personal computers, servers, laptops, tablets or smartphones connected to the docking/dongle device 200. A network interface controller (NIC) integrated in the docking/dongle device 200 may be used to perform network communications for the host device 100 and the electrical devices 320, 340, and 360.

Specifically, a default media access control (MAC) Address is assigned by the manufacturer of the NIC and is stored in the hardware memory of the NIC. In some embodiments of the present disclosure, a universal MAC (HBMA Address) may be stored in BIOS of the host device 100. If the host device 100 is connected to the docking/dongle device 200, the NIC in the docking/dongle device 200 may load the universal MAC address for network configuration. Thus, for docking/dongle device 200 assigned to multiple users, actions of users in the network system may still be tracked and/or managed based on the MAC Address since the MAC Address is updated to a specific Address corresponding to the host device 100.

Figure 2:
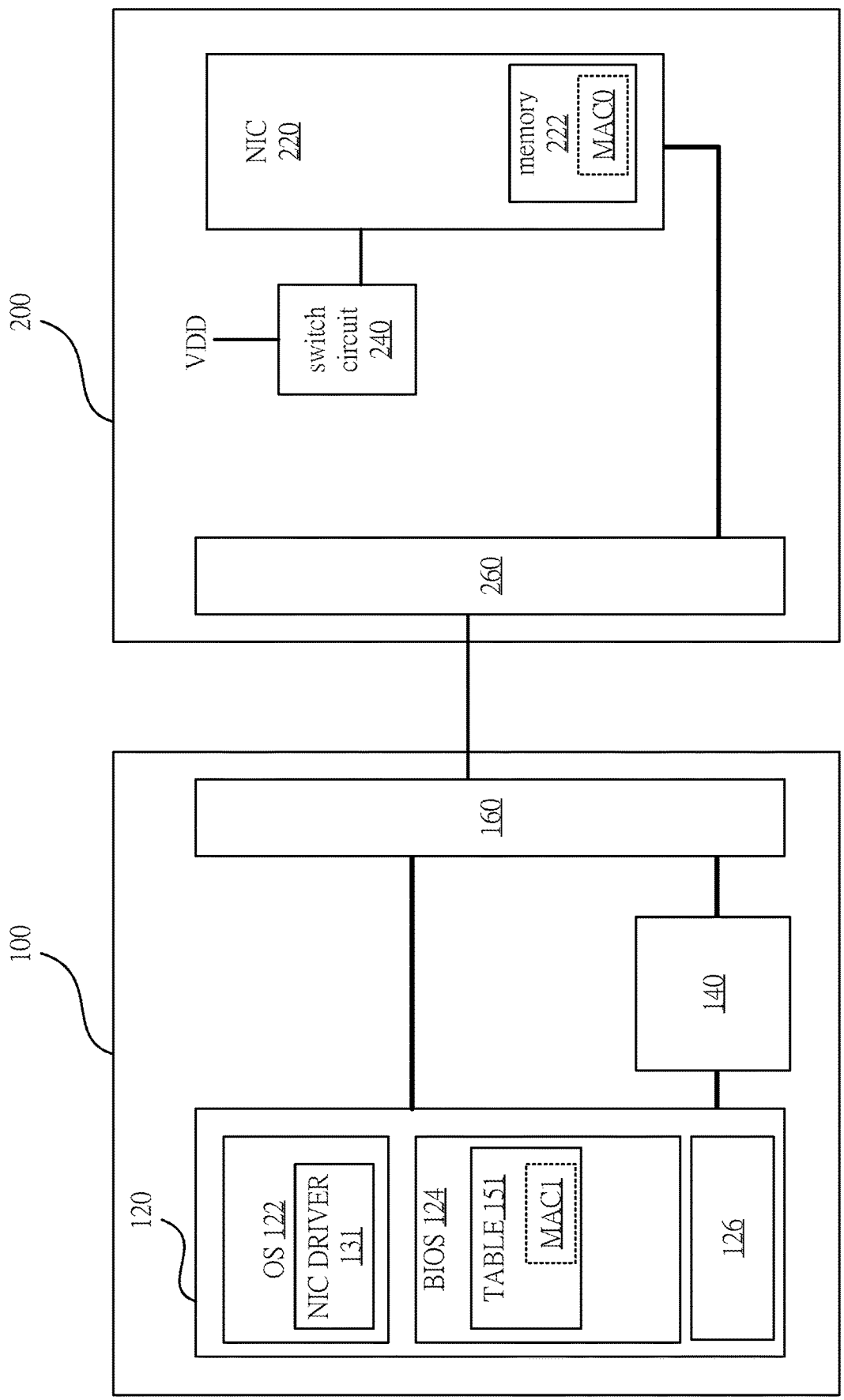
FIG. 2 is a schematic diagram illustrating a host device and a docking/dongle device according to some embodiments of the present disclosure.

For better understanding of the operations of MAC Address configuration, reference is made to FIG. 2. As shown in FIG. 2, the host device 100 includes a system memory 120, one or more processing components 140, and a bus interface 160. The one or more processing components 140 are coupled to the bus interface 160 and the system memory 120 via system interconnect, such as a system bus. The docking/dongle device 200 includes a NIC 220, a switch circuit 240 and a bus interface 260. The switch circuit 240 and the bus interface 260 are coupled to the NIC 220 respectively. In some embodiments, the bus interface 160 and the corresponding bus interface 260 may be achieved by a USB type-C interface, but the present disclosure is not limited thereto.

As shown, the memory 120 may include a plurality of modules, including operating system (OS) 122, basic input output system (BIOS) 124, firmware 126, etc. One or more program(s) are stored in the memory 120 and configured to be executed by the one or more processing components 140. The program(s) include instructions for operations of the NIC driver 131, BIOS driver 153, and/or firmware 126.

The OS 122 includes a NIC driver 131 configured to perform a mac address cloning method, in order to copy a host-based MAC address MAC1 stored in the BIOS 124 of the host device 100 to the NIC 220 in the docking/dongle device 200, such that the NIC 220 may load the universal MAC address for network configuration if the host device 100 is connected to the docking/dongle device 200 via the bus interfaces 160, 260.

The host-based MAC address MAC1 may be stored in a table 151 with a vendor specific format structure in BIOS 124 of the host device 100. For example, in some embodiments, the host-based MAC address MAC1 may be stored in the BIOS ACPI DSDT Table with a vendor specific header data format in BIOS 124. In some other embodiments, the host-based MAC address MAC1 may also be stored in SMBIOS or RAW vendor defined firmware table with a vendor specific header data format. The table 151 may be parsed by the NIC driver 131 to obtain the host-based MAC address MAC1 which is corresponding to the host device 100.

Thus, the NIC driver 131 may then update the host-based MAC address MAC1 via the bus interfaces 160, 260 to the docking/dongle device 200. Accordingly, the NIC 220 may be configured to receive the host-based MAC address MAC1 of the host device 100 and load the host-based MAC address MAC1 for network communication if the host device 100 is connected.

At the docking/dongle device 200 side, the NIC 220 includes a memory 220 configured to store a default MAC address MAC0 for the network communication. The switching circuit 240 is electrically coupled to the NIC 220 and the supplying voltage VDD. Accordingly, the switching circuit 240 is configured to power off the NIC 220 by disconnecting the NIC 220 from the supplying voltage VDD if the host device 100 is disconnected from the docking/dongle device 200.

Figure 3:
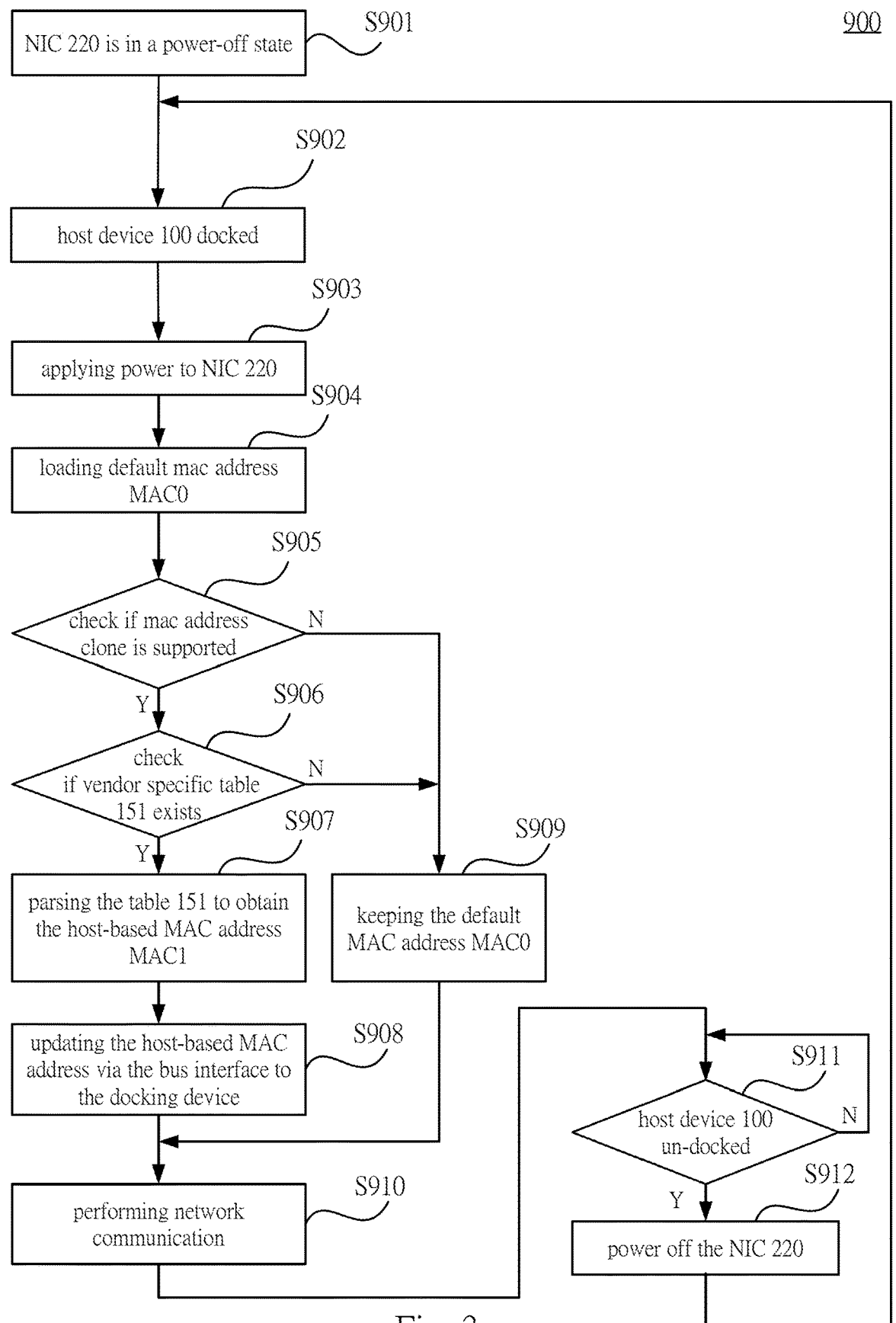
FIG. 3 is a flow chart of a mac address cloning method in accordance with some embodiments of the present disclosure.

Reference is made to FIG. 3. The co-operations of the host device 100 and the docking/dongle device 200 in the embodiments of FIG. 2 are also described below.

As shown in FIG. 3, the mac address cloning method 900 includes operations S901~S912. In operation S901, the NIC 220 is in a power-off state while no host device 100 is docked to the docking/dongle device 200. In operation S902, if the docking/dongle device 200 detects the host device 100 is docked via the bus interfaces 160 and 260, operation S903 is executed and the supplying voltage VDD (e.g., about 5V) is applied to the NIC 220 to enable the NIC 220 start working.

Next, after the NIC 220 is enabled, the NIC 220 of the docking/dongle device 200 is configured to load the default MAC address MAC0 stored in the memory 222 of the docking/dongle device 200 for a network communication, as shown in operation S904.

Next, as the NIC driver 131 is invoked as the host device 100 is docked to the docking/dongle device 200, the NIC driver 131 is configured to check one or more conditions in order to determine whether performing the MAC Clone process or not.

In the operation S905, the NIC driver 131 is configured to check whether the MAC Clone feature is supported in driver.

If the MAC Clone feature is supported, the NIC driver 131 is further configured to perform the operation S906 and check whether the table 151 (e.g., a BIOS advanced configuration and power interface (ACPI) table, a system management basic input output system (system management BIOS, SMBIOS) table, or a RAW vendor defined firmware table) with the vendor specific header data exists.

If requirements are satisfied, the operations S907 and S908 are executed. In the operations S907, the NIC driver 131 is configured to parse the table 151 with the vendor specific format structure stored in BIOS 124 of the host device 100 connected to the docking/dongle device 200 to obtain the host-based MAC address MAC1 corresponding to the host device 100. Then, in the operations S908, the NIC driver 131 is configured to transmit the host-based MAC address MAC1 via the bus interfaces 160 and 260 to the NIC 220 in the docking/dongle device 200.

On the other hand, if one of the requirements is not satisfied, the operation S909 is executed and the default MAC address MAC0 stored in the memory 222 is kept for network configuration.

Thus, in the operation S910, the NIC 220 may perform network communication. Alternatively stated, the NIC 220 may load the host-based MAC address MAC1 corresponding to the host device 100 for the network communication if the host device 100 is connected to the docking device 200. Moreover, the NIC 220 may also be configured to selectively load the default MAC address MAC0 if the MAC Address Clone is not supported or the vendor specific table 151 does not exist.

In the operation S911, if the docking/dongle device 200 detects the host device 100 is un-docked and disconnected from the docking/dongle device 200, the operation S912 is executed and the supplying voltage VDD (e.g., about 5V) is removed from the NIC 220 to power off the NIC 220.

Specifically, in the operation S912, the switching circuit 240 is configured to power off the NIC 220 in order to erase the host-based MAC address MAC1 stored in the NIC 220. Once the NIC 220 is powered off, the host-based MAC address MAC1 is erased, and the NIC 220 may be configured to load the default MAC address if the previous host device 100 is disconnected from the docking/dongle device 200 when the NIC 220 is again restarted.

Figure 4:
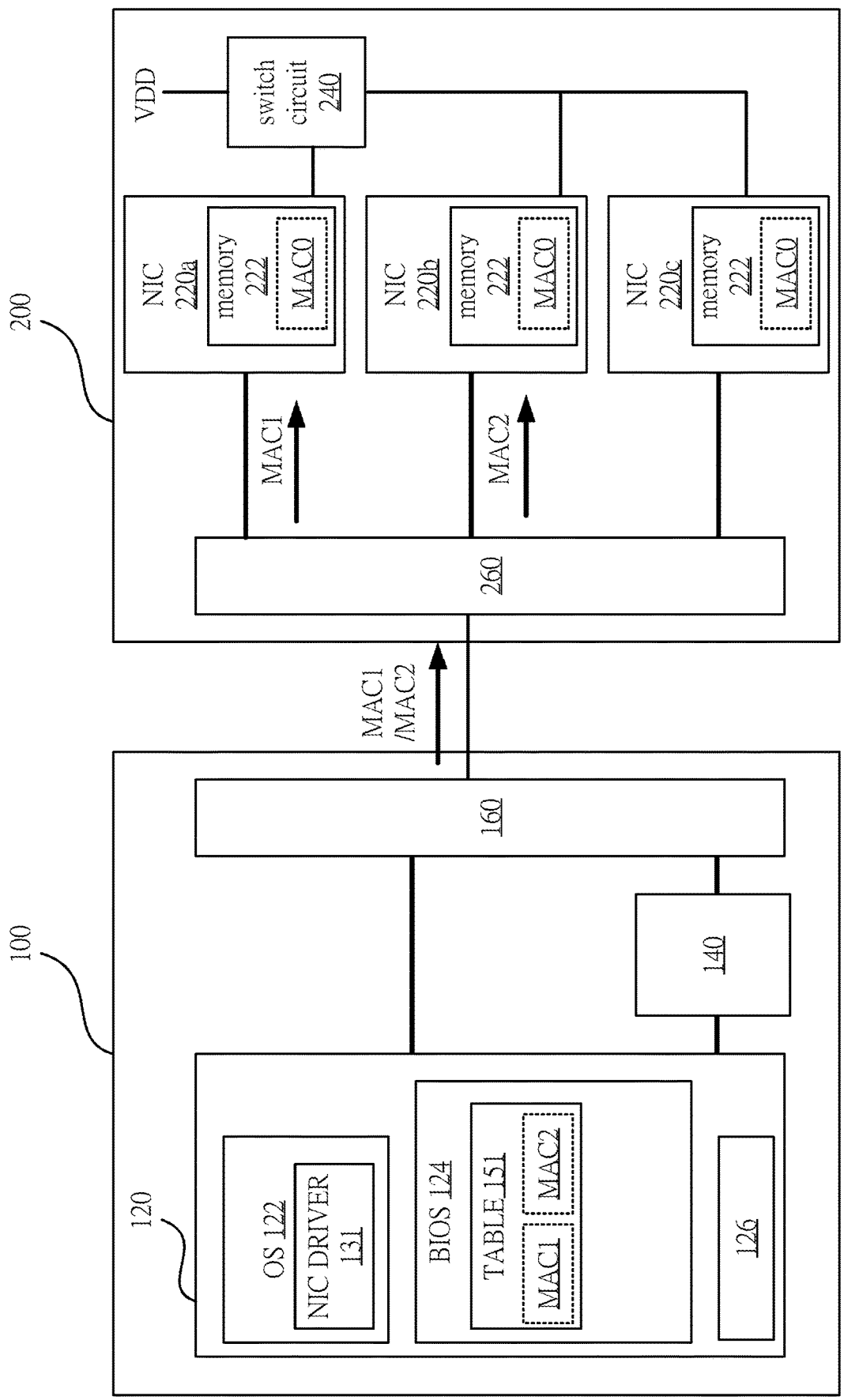
FIG. 4 is a schematic diagram illustrating the host device and the docking/dongle device according to some embodiments of the present disclosure.

Reference is made to FIG. 4. As shown in FIG. 4, in some embodiments, the NIC driver 131 may process multiple Universal MAC Addresses support if more than one MAC Addresses are required. Specifically, multiple universal MAC addresses MAC1, MAC2 may be defined in the table 151 with the vendor specific format structure in order to meet the requirement.

For example, in some embodiments, multiple NICs 220a, 220b, 220c are arranged in the docking/dongle devices 200. In some other embodiments, the host device 100 may also be connected to multiple docking/dongle devices 200 at the same time, or multiple docking/dongle devices 200 are chained together. During such condition, the NIC driver 131 may respectively pass the universal MAC addresses MAC1, MAC2, which are not occupied, to the NIC 220a and the NIC 220b as the host-based MAC address for the network communication.

In some embodiments, priorities may be respectively assigned to the universal MAC addresses MAC1, MAC2 defined in the table 151, and the NIC driver 131 is configured to select the one of universal MAC addresses not occupied based on priorities of the universal MAC addresses MAC1, MAC2.

Alternatively stated, the NIC driver 131 may determine priorities of the universal MAC addresses MAC1, MAC2, and then pass the universal MAC addresses MAC1, MAC2 to a plurality of NICs connected to the bus interface 160 based on the priorities of the universal MAC addresses MAC1, MAC2.

Similarly, the NIC driver 131 may also determining priorities of the NICs 220a, 220b, 220c connected to the bus interface 160, and pass the universal MAC addresses MAC1, MAC2 to the NICs 220a, 220b connected to the bus interface 160 for the network communication based on the priorities the NICs 220a, 220b, 220c.

Furthermore, the NIC driver 131 may perform a conflict protection if an amount of the NICs connected to the bus interface 160 reaches an upper limit. Under the conflict protection, one or more NICs (e.g., the NIC 220c) connected to the bus interface 160 with lower priorities are configured to load the default MAC address MAC0 stored in the memory 222 of the NIC 220c for the network communication. As depicted in FIG. 4, if the amount of the universal MAC addresses being occupied reaches the upper limit, the NIC 220c is configured to load the default MAC address MAC0 for the network communication.

Alternatively stated, if more than one NICs 220a, 220b and 220c need Universal MAC addresses, BIOS 124 may store multiple Universal MAC addresses MAC1, MAC2 and send the same to NIC 220a, 220b based on a known MAC Address priority list. The MAC Address with a first priority is used for the first MAC Clone supported device and so on. If the number of Universal MAC is not enough, a protection mechanism is applied and one or more devices with low priorities is/are configured to load the default MAC address MAC0 for the network communication to prevent MAC conflict issue occurs.

Figure 5:
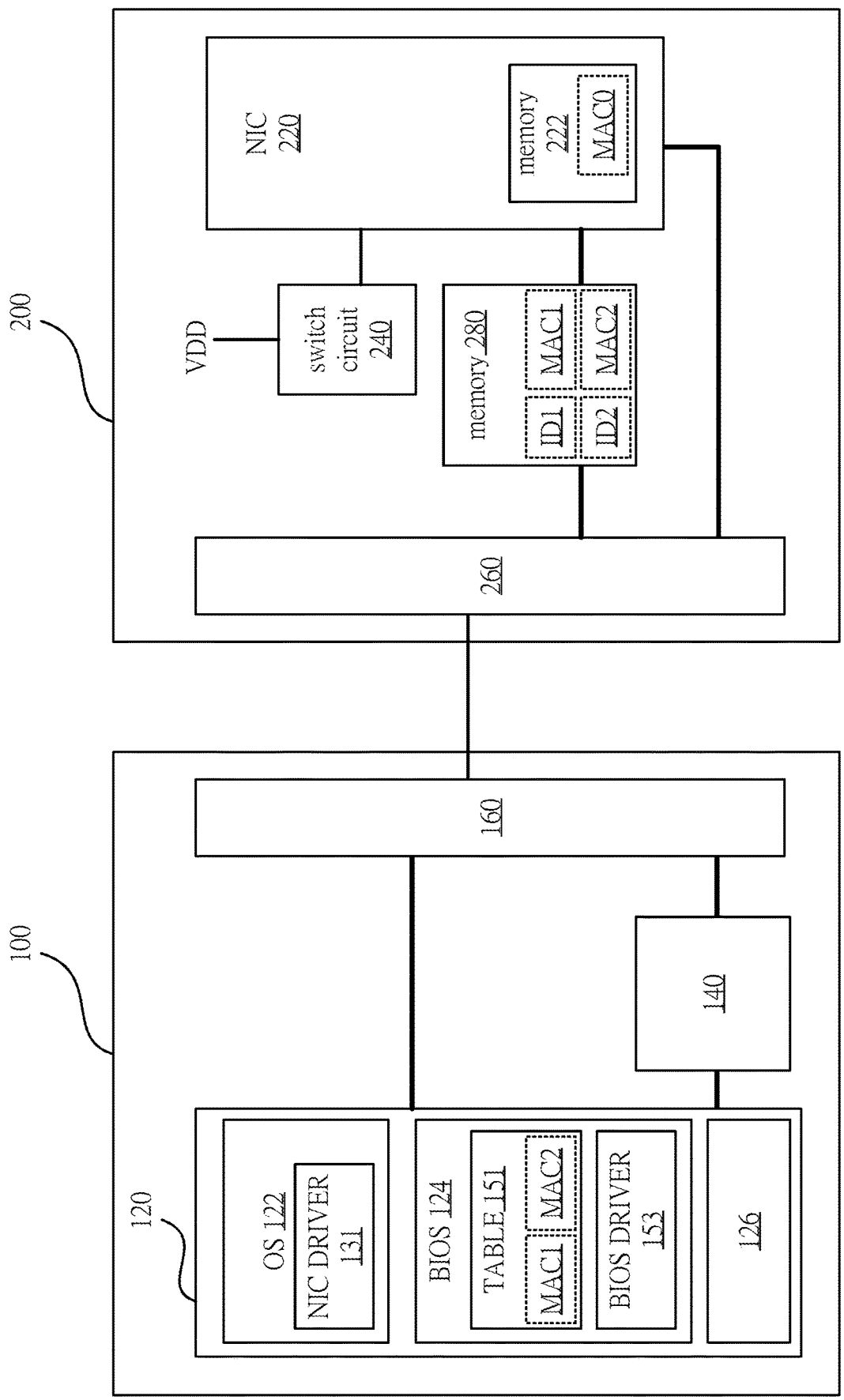
FIG. 5 is a schematic diagram illustrating the host device and the docking/dongle device according to some other embodiments of the present disclosure.

Reference is made to FIG. 5. In the embodiments shown in FIG. 5, the docking/dongle device 200 further includes an external memory 280 coupled to the bus interface 260. The external memory 280 may be configured to store the host-based MAC addresses MAC1, MAC2 and corresponding identifiers ID1, ID2 respectively. At the host device side, the BIOS 124 includes a BIOS driver 153 operated in the bios stage before the operating system stage is entered.

Figure 6:
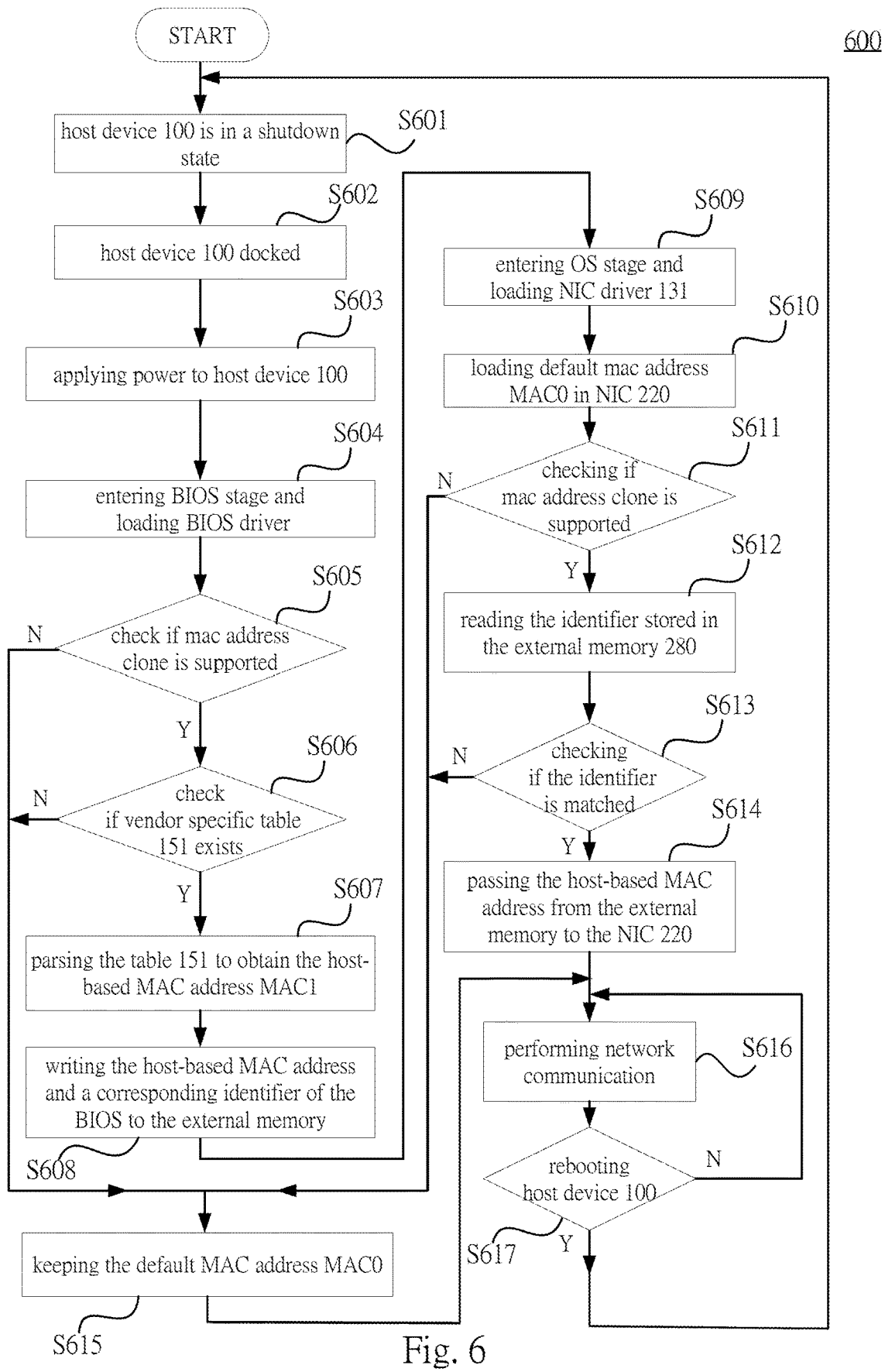
FIG. 6 is a flow chart of the mac address cloning method in accordance with some other embodiments of the present disclosure.

Reference is made to FIG. 6. The co-operations of the host device 100 and the docking/dongle device 200 in the embodiments of FIG. 5 are also described below.

As shown in FIG. 6, the mac address cloning method 600 includes operations S601~S617. In operation S601, the host device 100 is in a shutdown state. In operation S602, the host device 100 is docked to the docking/dongle device 200 via the bus interfaces 160 and 260. In operation S603, the power is supplied to the host device 100 to boot the host device 100.

Next, in operation S604, as the host device 100 is booted and entering the BIOS stage, the BIOS driver 153 is loaded and invoked.

The BIOS driver 153 is configured to check one or more conditions in order to determine whether performing the MAC Clone process or not.

In the operation S605, the BIOS driver 153 is configured to check whether the MAC Clone feature is supported in driver. If the MAC Clone feature is supported, the BIOS driver 153 is further configured to perform the operation S606 and check whether the table 151 (e.g., a BIOS ACPI table, a SMBIOS table, or a RAW vendor defined firmware table) with the vendor specific header data exists.

If both requirements are satisfied, the operations S607 and S608 are executed. In the operations S607, the BIOS driver 153 is configured to parse the table 151 with the vendor specific format structure stored in BIOS 124 of the host device 100 connected to the docking/dongle device 200 to obtain the host-based MAC address MAC1 corresponding to the host device 100. Then, in the operations S608, in the BIOS stage, the BIOS driver 153 is configured to write the host-based MAC address MAC1 and a corresponding identifier ID1 of the BIOS 124 to the external memory 280 in the docking/dongle device 200 connected to the bus interfaces 160 and 260.

Then, in the operation S609, as the host device 100 enters the operating system stage, the NIC driver 131 is loaded and invoked. In the operation S610, as the NIC 220 is enabled, the NIC 220 of the docking/dongle device 200 is configured to load the default MAC address MAC0 stored in the memory 222 of the docking/dongle device 200 for the network communication.

In the operation S611, the NIC driver 131 is configured to check whether the MAC Clone feature is supported in driver. If the MAC Clone feature is supported, the NIC driver 131 is further configured to read the identifiers ID1, ID2 stored in the external memory 280 in the operating system stage and determine whether the identifiers ID1, ID2 stored in the external memory 280 matches the identifier of the system BIOS in the operations S612 and S613.

If both requirements are satisfied, the operation S614 is executed and the NIC driver 131 is configured to pass the host-based MAC address (e.g., MAC1) in the external memory 280 corresponding to the identifier (e.g., ID1) to the NIC 220 for the network communication in the operating system stage if the identifier is matched to the identifier of the system BIOS.

If one of the requirements in operations S605, S606, S611, or S613 is not satisfied, the operation S615 is executed and the default MAC address MAC0 stored in the memory 222 is kept.

Thus, in the operation S616, the NIC 220 may perform network communication and selectively load the host-based MAC address MAC1 corresponding to the host device 100 or the default MAC address MAC0 for the network communication, depending on whether the host device 100 including the host-based MAC address is connected to the docking device 200 and whether the MAC Address Clone is supported.

In the operation S617, if the host device 100 is rebooted, the operation S601 is again executed.

It is noted that, in some other embodiments, the external memory 280 may also be arranged in the host device 100 or in an independent electrical device. Accordingly, the embodiments shown in FIG. 5 and FIG. 6 are merely by examples and not meant to limit the present disclosure.

If the host device 100 is under out-of-band, a hardware mechanism may be apply such that the hardware of the docking/dongle device 200 uses the host-based MAC address stored in the BIOS 124. Specifically, a Wake-On- LAN/Wake-On-WAN may be made by the user while the network system is under Out-of-Band.

Figure 7:
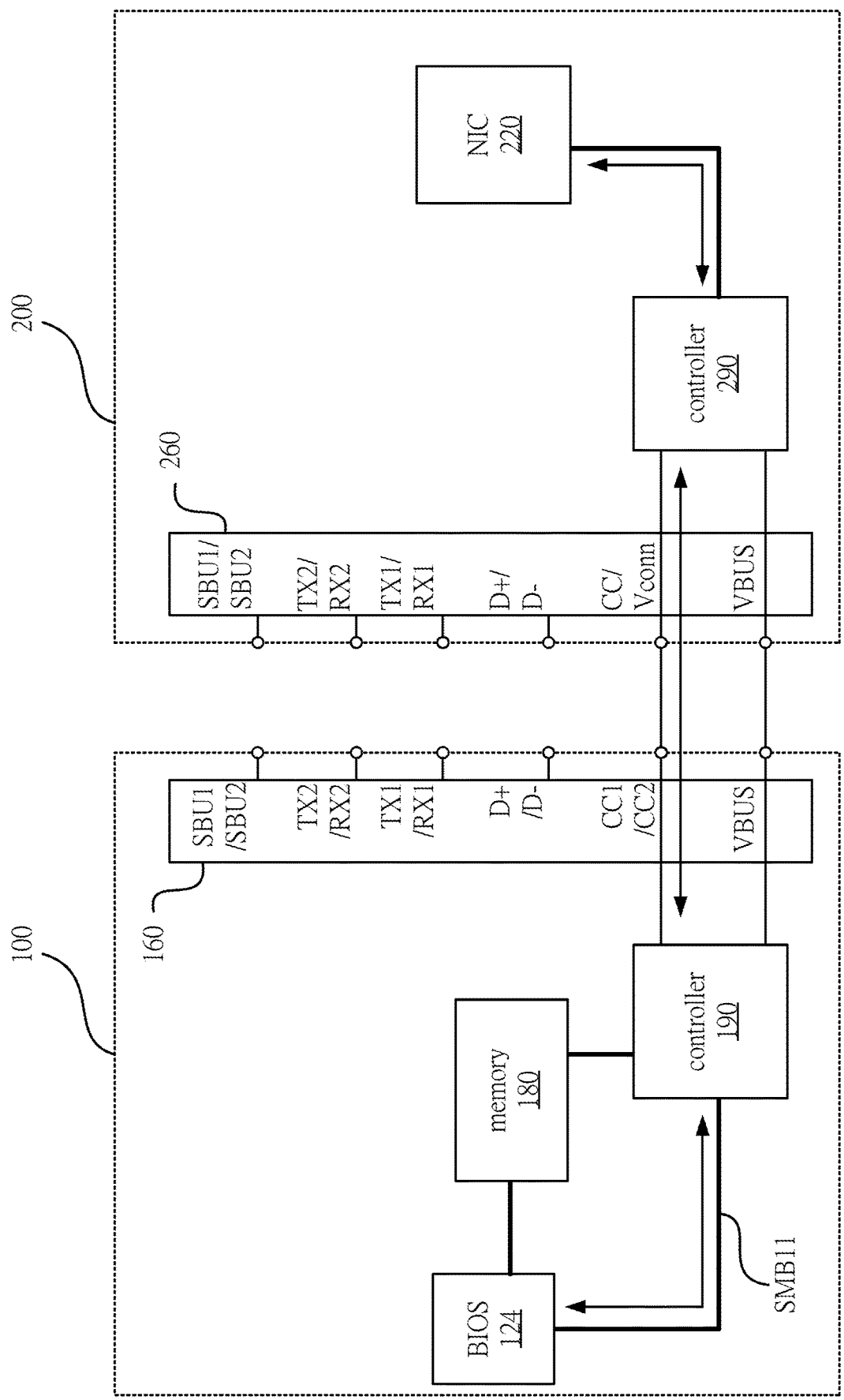
FIG. 7 is a schematic diagram illustrating the host device and the docking/dongle device according to some embodiments of the present disclosure.

Reference is made to FIG. 7. In some embodiments, the host device 100 further includes a controller 190, such as a power delivery (PD) controller. The bus interface 160 is coupled to the controller 190 via corresponding pins. The BIOS 124 is electrically coupled to the controller 190 via a system management bus SMbus SMB11. For some embodiments, the host device 100 may include an external memory 180, which is communicatively coupled to the BIOS 124 and the controller 190 with the vendor defined interface.

The docking/dongle device 200 also includes a controller 290, such as a PD controller. In some other embodiments, the controllers 190 and 290 may also be achieved by thunderbolt sideband controllers or other SOCs. The bus interface 260 is coupled to the controller 290 via the corresponding pins. The NIC 220 may be coupled to the PD controller 240 via a SMbus, an I2C, or an EEPROM pin.

Accordingly, the BIOS 124 may provide the vendor specific header data format from ACPI or SMBIOS table and pass to the SMBUS SMB11 with the standard protocol PLDM/MCTP to the controller 190. The controller 190 may provide a SMBUS and protocol decoding function to pass the BIOS SMBIOS or vendor specific protocol to the controller 290 in the docking/dongle device 200.

The controller 290 may be configured to translate the raw data passed from the BIOS 124 to a standard EEPROM waveform format and sent to the EEPROM pin of the NIC 220. It is noted that, in some other embodiments, the controller 290 may also communicate with the NIC 220 by the SMbus or the I2C bus.

Accordingly, the NIC 220 may provide a wake signal to the controller 290. As the controller 290 correspondingly proceed the vender specific VDM message to the controller 190 in the host device 100, further wake up process may be completed at the host side.

Moreover, if the external memory 180 is used for the storage of the host-based MAC address, the controller 190 may read the host-based MAC address from the external memory 180 and send data to the controller 290 without the SMBUS used.

Thus, by various approach described above, mac address cloning under Out-Of-Band and Wake-On-LAN/Wake-On-WAN function under Out-of-Band may be achieved.

Although the present disclosure has been described in considerable detail with reference to certain embodiments thereof, other embodiments are possible.

What is claimed is:

1. A docking device, comprising:
   a bus interface configured to be connected to a host device; and
   a network interface controller (NIC) coupled to the bus interface, and configured to receive a host-based media access control (MAC) address of the host device and load the host-based MAC address for a network communication if the host device is connected to the docking device via the bus interface;
   wherein the host-based MAC address is stored in a table with a vendor specific format structure in a basic input output system (BIOS) of the host device; and
   wherein a plurality of universal MAC addresses are defined in the table with the vendor specific format structure, and one of the universal MAC addresses not occupied is passed by a NIC driver to the network interface controller as the host-based MAC address for the network communication.

2. The docking device of claim 1, wherein the table with the vendor specific format structure is parsed by the NIC driver to obtain the host-based MAC address corresponding to the host device.

3. The docking device of claim 1, wherein the network interface controller comprises a first memory configured to store a default MAC address, and the network interface controller is configured to selectively load the default MAC address for the network communication.

4. The docking device of claim 1, further comprising:
   a switching circuit electrically coupled to the network interface controller and configured to power off the network interface controller if the host device is disconnected from the docking device, to erase the host-based MAC address stored in the network interface controller.

5. The docking device of claim 1, wherein the NIC driver is configured to select the one of universal MAC addresses not occupied based on priorities of the universal MAC addresses.

6. The docking device of claim 1, wherein the network interface controller comprises the first memory configured to store the default MAC address, if an amount of the universal MAC addresses being occupied reaches an upper limit, the network interface controller is configured to load the default MAC address for the network communication.

7. The docking device of claim 3, further comprising:
   a second memory coupled to the bus interface;
   wherein the host-based MAC address and a corresponding identifier of the BIOS is written by a BIOS driver to the second memory during a BIOS stage; and
   the host-based MAC address corresponding to the identifier is passed by the NIC driver from the second memory to the network interface controller for the network communication if the second memory is read by the NIC driver, and the identifier is matched in the second memory during an operating system stage.

8. An electrical device, comprising:
   a bus interface configured to be connected to a docking device comprising a network interface controller (NIC);
   one or more processing components coupled to the bus interface;
   a first memory coupled to the one or more processing components; and
   one or more programs, wherein the one or more programs are stored in the first memory and configured to be executed by the one or more processing components, the one or more programs comprising instructions for:
   parsing a table with a vendor specific format structure stored in a basic input output system (BIOS) of the electrical device to obtain a host-based media access control (MAC) address corresponding to the electrical device;
   transmitting, the host-based MAC address via the bus interface to the docking device for the docking device to load for a network communication if the docking device is connected to the bus interface;
   in a BIOS stage, writing the host-based MAC address and a corresponding identifier of the BIOS to a second memory;
   in an operating system stage, reading the identifier stored in the second memory; and
   in the operating system stage, passing the host-based MAC address corresponding to the identifier in the second memory to the network interface controller for the network communication if the identifier is matched;

wherein a plurality of universal MAC addresses are defined in the table with the vendor specific format structure, and the one or more programs further comprises instructions for:

passing one of the universal MAC addresses not occupied as the host-based MAC address to the docking device.

9. The electrical device of claim 8, wherein the table with the vendor specific format structure comprises a BIOS advanced configuration and power interface (ACPI) table, a system management basic input output system (system management BIOS, SMBIOS) table, or a vendor defined firmware table.

10. The electrical device of claim 8, wherein the one or more programs further comprises instructions for:

determining priorities of the plurality of universal MAC addresses; and passing the plurality of universal MAC addresses to a plurality of NICs connected to the bus interface based on the priorities of the plurality of universal MAC addresses.

11. The electrical device of claim 8, wherein the one or more programs further comprises instructions for:

determining priorities of a plurality of NICs connected to the bus interface; and passing the plurality of universal MAC addresses to the NICs connected to the bus interface for the network communication based on the priorities of the plurality of the NICs.

12. The electrical device of claim 11, wherein the one or more programs further comprises instructions for:

performing a conflict protection if an amount of the NICs connected to the bus interface reaches an upper limit;

wherein under the conflict protection, one or more NICs connected to the bus interface with lower priorities are configured to load a default MAC address stored in the first memory of the NIC for the network communication.

13. A mac address cloning method, comprising loading, by a network interface controller (NIC) of a docking device, a default media access control (MAC) address stored in a first memory of the docking device for a network communication;

parsing, by a NIC driver, a table with a vendor specific format structure stored in a basic input output system (BIOS) of a host device connected to the docking device to obtain a host-based MAC address corresponding to the host device;

transmitting, by the NIC driver, the host-based MAC address via a bus interface to the docking device;

loading, by the network interface controller, the host-based MAC address for the network communication if the host device is connected to the docking device;

providing a plurality of universal MAC addresses defined in the table with the vendor specific format structure; and passing, by the NIC driver, one of the universal MAC addresses not occupied as the host-based MAC address to the docking device for the network communication.

14. The mac address cloning method of claim 13, further comprising:

determining, by the NIC driver, priorities of a plurality of docking devices communicatively coupled to the host device; and passing, by the NIC driver, the plurality of universal MAC addresses to the docking devices communicatively coupled to the host device for the network communication based on the priorities of the plurality of the docking devices.

15. The mac address cloning method of claim 14, further comprising:

performing a conflict protection if an amount of the docking devices communicatively coupled to the host device reaches an upper limit; and loading, by at least one docking device communicatively coupled to the host device with a lower priority, a default MAC address stored in the first memory of the at least one docking device for the network communication under the conflict protection.

16. The mac address cloning method of claim 13, further comprising:

writing, by a BIOS driver, the host-based MAC address and a corresponding identifier of the BIOS to a second memory in a BIOS stage of the host device;

checking, by the NIC driver, the identifier stored in the second memory in an operating system stage; and passing, by the NIC driver, the host-based MAC address in the second memory corresponding to the identifier to the network interface controller for the network communication in the operating system stage if the identifier is matched.

* * * * *